(12) United States Patent
Nelson et al.

(10) Patent No.: US 11,922,497 B1
(45) Date of Patent: Mar. 5, 2024

(54) SYSTEM, METHOD AND APPARATUS FOR GENERATING CREDIT SCORES

(71) Applicant: VantageScore Solutions, LLC, South San Francisco, CA (US)

(72) Inventors: Greg Nelson, Rancho Cucamonga, CA (US); Andrada Ioana Pacheco, Danbury, CT (US); Nicholas Andrew Rose, Naperville, IL (US); Yusuf Emre Sahingur, Penn Valley, PA (US); Rikard Kaj Ragnar Bandebo, Old Greenwich, CT (US); Silvio Tavares, Burlingame, CA (US)

(73) Assignee: VANTAGESCORE SOLUTIONS, LLC, South San Francisco, CA (US)

( * ) Notice: Subject to any disclaimer, the term of this patent is extended or adjusted under 35 U.S.C. 154(b) by 0 days.

(21) Appl. No.: 18/050,081

(22) Filed: Oct. 27, 2022

(51) Int. Cl.
*G06Q 40/00* (2023.01)
*G06Q 40/03* (2023.01)

(52) U.S. Cl.
CPC .................................. *G06Q 40/03* (2023.01)

(58) Field of Classification Search
None
See application file for complete search history.

(56) References Cited

U.S. PATENT DOCUMENTS

| | | | |
|---|---|---|---|
| 10,242,019 B1 * | 3/2019 | Shan | G06N 7/01 |
| 10,521,819 B2 * | 12/2019 | Bonalle | G06Q 40/02 |
| 10,580,724 B2 | 3/2020 | Britti et al. | |
| 10,614,519 B2 | 4/2020 | Taylor et al. | |
| 10,621,203 B2 | 4/2020 | Hunt et al. | |
| 10,671,749 B2 * | 6/2020 | Felice-Steele | G06F 16/13 |
| 10,680,811 B1 * | 6/2020 | Stanton | H04W 12/63 |
| 10,685,336 B1 | 6/2020 | Burger et al. | |
| 10,686,773 B2 | 6/2020 | Britti et al. | |
| 10,726,151 B2 | 7/2020 | Eisen et al. | |
| 10,757,154 B1 | 8/2020 | Jacobs et al. | |
| 10,810,218 B2 | 10/2020 | Ng et al. | |

(Continued)

OTHER PUBLICATIONS

A Novel Multi-Stage Ensemble Model With a Hybrid Genetic Algorithm for Credit Scoring on Imbalanced Data, IEEE (Year: 2021).*

(Continued)

*Primary Examiner* — Bruce I Ebersman
(74) *Attorney, Agent, or Firm* — Panitch Schwarze Belisario & Nadel LLP

(57) ABSTRACT

A method employs consumer permissioned financial data to generate an updated credit score following a consumer authorization to access to at least one demand deposit account of the consumer for use in generating the credit score for the consumer. The consumer permissioned financial data may be sourced from any one of a plurality of aggregators where the aggregators employ different data structures for the financial data. The financial data is processed to automatically normalize the data received from an aggregator by applying a common classification system across the plurality of aggregators to classify a first set of data fields; and automatically, regardless of whether an updated credit score is advantageous for the consumer and independent of any further consumer permission, generating the updated credit score using a combination of credit file data for the consumer and the financial data received from the aggregator.

8 Claims, 7 Drawing Sheets

(56) References Cited

U.S. PATENT DOCUMENTS

| | | | |
|---|---|---|---|
| 11,017,364 B2 | 5/2021 | Smith et al. | |
| 11,159,593 B1 | 10/2021 | Jacobs et al. | |
| 11,250,514 B2* | 2/2022 | Kumar | B60W 30/10 |
| 11,270,376 B1* | 3/2022 | Rose | G06Q 10/067 |
| 11,316,942 B2 | 4/2022 | Thomas et al. | |
| 11,443,373 B2 | 9/2022 | Courbage et al. | |
| 2001/0039523 A1* | 11/2001 | Iwamoto | G06Q 40/08 705/35 |
| 2002/0120559 A1* | 8/2002 | O'Mara | G06Q 40/08 705/38 |
| 2005/0086579 A1 | 4/2005 | Leitner et al. | |
| 2005/0096950 A1 | 5/2005 | Caplan | |
| 2006/0267999 A1 | 11/2006 | Cash | |
| 2006/0293979 A1 | 12/2006 | Cash | |
| 2008/0027841 A1 | 1/2008 | Eder | |
| 2008/0162383 A1* | 7/2008 | Kraft | G06Q 99/00 705/500 |
| 2008/0294996 A1 | 11/2008 | Hunt | |
| 2009/0018996 A1 | 1/2009 | Hunt | |
| 2009/0222375 A1 | 9/2009 | Choudhuri | |
| 2009/0222377 A1 | 9/2009 | Choudhuri | |
| 2009/0222379 A1 | 9/2009 | Choudhuri | |
| 2009/0299911 A1 | 12/2009 | Abrahams | |
| 2010/0185534 A1* | 7/2010 | Satyavolu | H04M 15/8083 705/30 |
| 2010/0223211 A1 | 9/2010 | Johnson | |
| 2010/0332373 A1* | 12/2010 | Crabtree | G06Q 40/04 709/224 |
| 2011/0137924 A1 | 6/2011 | Hunt | |
| 2012/0036055 A1 | 2/2012 | Morris | |
| 2012/0246048 A1 | 9/2012 | Cohen | |
| 2012/0260209 A1* | 10/2012 | Stibel | G06Q 40/02 715/780 |
| 2013/0218751 A1* | 8/2013 | Chaudhuri | G06Q 20/10 705/38 |
| 2013/0317954 A1 | 11/2013 | Psota | |
| 2013/0325681 A1* | 12/2013 | Somashekar | H04M 15/851 705/35 |
| 2014/0019333 A1 | 1/2014 | Morris | |
| 2014/0081835 A1 | 3/2014 | Choudhuri | |
| 2014/0201838 A1* | 7/2014 | Varsanyi | G06F 21/552 726/23 |
| 2014/0310151 A1* | 10/2014 | Shishkov | G06Q 40/03 705/38 |
| 2014/0365350 A1* | 12/2014 | Shvarts | G06Q 40/00 705/35 |
| 2014/0365353 A1* | 12/2014 | Shvarts | G06Q 40/03 705/38 |
| 2015/0073929 A1 | 3/2015 | Psota | |
| 2015/0112874 A1 | 4/2015 | Serio | |
| 2016/0224996 A1 | 8/2016 | Hunt | |
| 2017/0053297 A1 | 2/2017 | Malaviya et al. | |
| 2017/0053336 A1* | 2/2017 | Barbour | G06Q 30/0201 |
| 2017/0323358 A1 | 11/2017 | Psota | |
| 2018/0033023 A1 | 2/2018 | Pereira et al. | |
| 2018/0285886 A1 | 10/2018 | Yan | |
| 2020/0034927 A1 | 1/2020 | Smith et al. | |
| 2020/0074099 A1 | 3/2020 | Felice-Steele et al. | |
| 2020/0074100 A1 | 3/2020 | Raneri et al. | |
| 2020/0074541 A1 | 3/2020 | Finneran et al. | |
| 2020/0074542 A1 | 3/2020 | Manna et al. | |
| 2020/0076813 A1 | 3/2020 | Felice-Steele et al. | |
| 2020/0160364 A1 | 5/2020 | Milton et al. | |
| 2020/0184556 A1* | 6/2020 | Cella | G06V 10/762 |
| 2020/0202425 A1 | 6/2020 | Taylor-Shoff et al. | |
| 2020/0233850 A1 | 7/2020 | Girulat, Jr. | |
| 2021/0056619 A9 | 2/2021 | Smith et al. | |
| 2021/0248514 A1* | 8/2021 | Cella | G06V 20/20 |
| 2021/0326979 A1 | 10/2021 | Smith et al. | |
| 2021/0326980 A1 | 10/2021 | Thomas et al. | |
| 2021/0383394 A1 | 12/2021 | Zarakas et al. | |
| 2022/0174127 A1 | 6/2022 | Thomas et al. | |
| 2022/0291666 A1* | 9/2022 | Cella | B25J 13/00 |
| 2022/0366494 A1* | 11/2022 | Cella | H04L 9/50 |

OTHER PUBLICATIONS

Fairness in Credit Scoring: Assessment, Implementation and Profit Implications, arxiv (Year: 2021).*

Applications of artificial intelligence technologies in credit scoring: A survey of literature IEEE (Year: 2014).*

Credit Scoring Model Implementation in a Microfinance Context IEEE (Year: 2019).*

Rep. Melvin Watt Holds a Hearing on Credit Scoring Models and Credit Card Scores. (Jul. 30, 2008). Political Transcript Wire. Retrieved from https://dialog.proquest.com/professional/docview/467218052?accountid=131444 on Mar. 7, 2023 (Year: 2008).

Steele, G. (2006). Changing the scorecard; think you knew all there was to know about credit scoring? the credit bureaus have revised the rules with VantageScore. Broker Magazine, 8(6), 54-56. Retrieved from https://dialog.proquest.com/professional/docview/216502880?accountid=131444 on Mar. 7, 2023 (Year: 2006).

Fagan, B. W. (2022). Correlation of personal finance class and credit scores (Order No. 29065201). Available from ProQuest Dissertations and Theses Professional. Retrieved from https://dialog.proquest.com/professional/docview/2649015602?accountid=131444 on Mar. 7, 2023 (Year: 2022).

* cited by examiner

AGGREGATOR 1

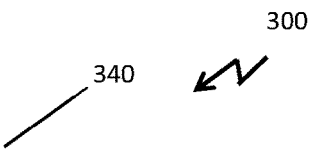

| Account Type | Aggregator Account Code | Class Identifier |
|---|---|---|
| 401K Retirement Plan | 401k | INV |
| Certificate of Deposit | cd | SAV |
| Mortgage | mortgage | CRD |
| Checking Account | checking | DDA |
| Credit Card | creditCard | CRD |

AGGREGATOR 2

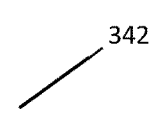

| Account Type | Aggregator Account Code | Class Identifier |
|---|---|---|
| 401K Retirement Plan | INVESTMENT | INV |
| Certificate of Deposit | INVESTMENT | SAV |
| Mortgage | MORTGAGE | CRD |
| Checking Account | CHECKING | DDA |
| Credit Card | CREDIT_CARD | CRD |

AGGREGATOR 3

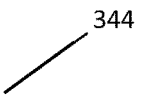

| Account Type | Aggregator Account Code | Class Identifier |
|---|---|---|
| 401K Retirement Plan | 401K | INV |
| Certificate of Deposit | CD | SAV |
| Mortgage | MORTGAGE | CRD |
| Checking Account | CHECKING | DDA |
| Credit Card | CREDIT | CRD |

FIG. 3

SYSTEM, METHOD AND APPARATUS FOR GENERATING CREDIT SCORES

BACKGROUND OF INVENTION

1. Field of Invention

This invention relates generally to generating credit scores. More specifically, at least one embodiment relates to a system, method and apparatus for generating credit scores using consumer permissioned financial data.

2. Discussion of Related Art

A credit score is a prerequisite for any adult to access and enjoy the full benefits available to residents in a modern first world country. A credit score is a numerical value based on a person's credit files intended to represent the creditworthiness of an individual. Credit scores are primarily based on a credit report, information typically sourced from credit bureaus also referred to as credit reporting agencies (CRAs) or credit reporting companies (CRCs). In the U.S., the information employed in calculating credit scores typically comes from one of the three major CRAs, Experian, TransUnion, and Equifax. Historically, credit scoring has focused on the individual consumer's debt burden and credit lines as demonstrated by their credit accounts and loan accounts. For example, the FICO scoring model relies on payment history, debt burden, length of credit history, types of credit used and the quantity of recent searches for credit. More recent approaches to credit scoring integrate consumer permissioned data sourced, for example, from a consumer's demand deposit accounts (DDA) such as checking accounts and savings accounts. Typically, lenders and other creditors do not directly interface with the financial institutions that hold the demand deposit accounts. They instead rely on aggregators who have existing processes setup by which the aggregators access the account data via the financial institutions, including balances and transaction histories. With the consumer's consent, the aggregators access and download the information and then communicate the account data for use in determining the consumer's credit score.

Some current approaches employ this consumer permissioned data to increase a consumer's credit score and improve the consumer's chances for approval or provide more favorable terms for a credit product such as a loan or a line of credit. However, these approaches allow a consumer to optionally (including only temporarily) employ their updated credit score. That is, even where a consumer has authorized the use of consumer permissioned data the updated credit scoring process is not completed unless the consumer agrees to do so after reviewing the updated credit score. Another barrier is that the creditor (bank, credit card company, etc.) has a burden to provide the consumer with an adverse action notice where, for example, consumer credit is denied or a charge for credit increased based on information obtained from third parties other than credit reporting agencies. This discourages creditors from offering a negative score as an option, because a lower score is generally indicative of a higher credit risk that results in a negative impact on the consumer's credit and triggers the corresponding notice requirement of creditors.

In some current approaches, an aggregator provides a technology platform that allows consumers to grant access to the financial information included in their demand deposit accounts for use by a third party that is generating a credit score for the consumer. In this role, the aggregator acts as a middleman between creditors and these third party sources of financial information. However, the credit scoring models employed by creditors, today, limit the source of information to a single aggregator which limits the utility and flexibility of these approaches. For example, a first creditor may employ a first credit scoring model that only sources consumer permissioned data from a first aggregator while a second creditor may employ a second credit scoring model that only sources consumer permissioned data from a second aggregator. One reason for the preceding restriction is that the provider of a particular credit scoring model maintains a business affiliation with the selected aggregator. Also, different aggregators employ different data structures for the consumer permissioned data. This is true even where the data is sourced from the same demand deposit accounts. Current approaches do not address the challenges created in trying to process the consumer permissioned financial data when the data can be sourced from more than one aggregator because of the restrictions imposed by one-to-one affiliations between credit scoring model and aggregators.

An example of current approaches is shown in FIG. 1 where a process 100 to generate an updated credit score is illustrated in accordance with the prior art. The process 100 begins at an act of providing a consumer seeking credit with an ability to opt-in 102 to select the use of consumer permissioned financial data (for example, data for one or more demand deposit accounts) in the generation of an updated credit score. If the consumer chooses to not permit the use of consumer permissioned financial data, the process 100 ends.

If at act 102 the consumer opts-in and authorizes a use of their consumer permissioned financial data, the process 100 continues. The process includes two acts that are completed in tandem. This includes an act of receiving financial data from a single aggregator 104 and an act of receiving credit file data from a single credit reporting company 106. At the act of receiving financial data from a single aggregator 104, data is received for one or more bank accounts accessed with the permission of the consumer. The process 100 illustrates that the financial data includes a set of bank account transactions 114. The financial data including the transactions is formatted in fields with associated field names as defined by the single aggregator. Each aggregator establishes the organization and identification in a manner that is unique to the aggregator and different from other aggregators. Similarly, most current credit scoring models can only establish the values of the attributes employed in the respective credit scoring model with data that is received in one known data structure. These approaches do not permit the use of data received from any one of the different CRCs given the different data structures employed by each. As a result, today's processes for generating updated credit scores are tied to credit file data sourced from a single credit reporting company (based on established business affiliations) in combination with consumer permissioned financial data sourced from a single aggregator.

An act of generating an updated credit score 108 follows a receipt of the financial data from the aggregator at the act 104 and a receipt of the credit file data from the CRC at the act 106. According to current approaches, the process 100 including the consumer opt-in is motivated by the consumer's interest in improving their credit score using consumer permissioned financial data. Consequently, the updated credit score that is generated at the act 108 is made available to the consumer for review. The process 100 next moves to an act of a consumer decision on using the updated credit score 110. Here, the consumer takes an opportunity to review the updated credit score to decide whether to establish the updated credit score as the consumer's new credit score. If the consumer finds that the updated credit score is less desirable than the consumer's original credit score, the process 100 ends and the creditor employs the original credit score when evaluating whether to extend credit to the consumer. Here, the "original credit score" refers to the score that the consumer had but was trying to improve with the inclusion of consumer permissioned financial data in the credit scoring process. If the consumer finds that the updated credit score is desirable and elects to use the score, the process 100 moves to an act of employing the updated credit score 112. In this instance, the creditor then employs the updated credit score when evaluating whether to extend the applied-for credit to the consumer. Alternatively, if the consumer evaluates the updated credit score and elects to not use the updated score, the process ends. In some instances, this ends the credit application process while in others the consumer's credit application is evaluated by the creditor using the credit score determined without the use of the consumer permissioned financial data.

The inclusion of consumer permissioned financial data in the credit scoring process is known to provide a more complete and accurate assessment of the creditworthiness of a consumer, that is, a more complete and accurate assessment of a likelihood of default by the consumer. One important aspect of the process 100 is that the consumer's choice provided at the act of the consumer decision on using the updated credit score 110, provides the consumer with the ability to select a less complete and less accurate credit score. This can result in a less informed decision by a creditor who may extend credit to a consumer who is more likely to default.

SUMMARY OF INVENTION

Therefore, there is a need for approaches that increase the accuracy of credit scores available to creditors. According to some embodiment described herein, consumer permissioned financial data provided by any of a plurality of aggregators can be employed in the credit scoring process. According to these embodiments, the credit scoring process includes one or more acts to normalize the consumer permissioned financial data to establish the value of attributes employed in the credit scoring model despite differences in the data structure employed by the respective aggregators. According to some further embodiments, the credit scoring process includes an ability to use credit file data from any one of a plurality of credit reporting agencies. According to these embodiments, the credit scoring process includes one or more acts of normalizing the credit file data. These embodiments allow values to be established for the various attributes in the credit scoring model regardless of which of the known data structures is employed by the credit reporting agency that provides the credit file data.

According to one aspect, a computer implemented method of generating a credit score is provided where the method is performed by a computing system including at least one computer processor and at least one non-transitory computer readable storage device storing software instructions executable by the computing system to perform the method. In some embodiments, a consumer an opt-in and credentials for access to at least one demand deposit account are received from a consumer for use in generating a credit score for the consumer using consumer permissioned data. The credentials are provided to a first aggregator selected from a plurality of aggregators, where each of the plurality of aggregators employ a different set of data fields for the consumer permissioned data, respectively. The respective different sets of data fields are uniquely identified by each of the plurality of aggregators. Financial data for the at least one demand deposit account is received from the first aggregator where the financial data is organized using a first set of data fields. The first set of data fields are organized and identified in a manner that is unique to the first aggregator. The financial data is processed to automatically normalize the financial data received from the first aggregator by applying a classification system that is common to the plurality of aggregators to classify the first set of data fields. Generating the updated credit score using a combination of credit file data for the consumer and the financial data received from the first aggregator automatically, regardless of whether an updated credit score is advantageous for the consumer and independent of any further consumer permission.

According to still another aspect, a non-transitory computer-readable medium comprising computer program instructions executable by at least one computer processor is provided where the computer program instructions when executed by the at least one computer processor perform a method of generating a credit score using the method described above.

According to a further aspect, a computer implemented method is provided to generate a credit score using consumer permissioned aggregated financial data provided by any of a plurality of different aggregators. In some embodiments, a classification system is defined for a plurality of different of financial products where the classification system establishes a class-identifier for each type of financial product included in the plurality of different financial products, respectively. Each one of a first plurality of account codes employed by a first aggregator is associated with one of the plurality of class-identifiers, respectively, where each one of the first plurality of account codes uniquely identifies a respective one of a plurality of different financial products. Further, each one of a second plurality of account codes employed by a second aggregator is associated with one of the plurality of class-identifiers, respectively, where each one of the second plurality of account codes uniquely identifies a respective one of the plurality of different financial products. A first set of financial data concerning a first consumer is received from the first aggregator, where the first set of financial data includes data for a first group of financial products including a first account of a first account-type. The first aggregator identifies the first account-type with a first account code. Each product-type of the first group of financial products is included in the plurality of different financial products. A second set of financial data concerning a second consumer is received from the second aggregator, where the second set of financial data includes data for a second group of financial products including a second account of the first account-type The second aggregator identifies the first account-type with a second account code that is different than the first account code. Each product-type of the second group of financial products is included in the plurality of different financial products.

The computer implemented method includes processing the first account code with the at least one computer processor to automatically classify with the classification system the first account with a first class-identifier, and processing the second account code with the at least one computer processor to automatically classify with the classification system the second account with a second class-identifier, the second class-identifier being the same as the first class-identifier. Based at least in part on the first class-identifier, the first type of financial product is associated with a first attribute in determining a first credit score for a first consumer. Based at least in part on the second class-identifier, the first type of financial product is associated with a second attribute in determining a second credit score for a second consumer.

According to still another aspect, a non-transitory computer-readable medium comprising computer program instructions executable by at least one computer processor is provided where the computer program instructions when executed by the at least one computer processor perform a method of generating a credit score using consumer permissioned aggregated financial data provided by any of a plurality of different aggregators using the method described above.

As used herein, the term normalize means an approach to establish, from data received in different data structures, values for attributes employed in a credit scoring model. One of ordinary skill in the art will recognize based on the disclosure provided herein, that an act of normalizing may result in information from different data fields not found in each of the different data structures being employed to establish the value of the same attribute.

The terms credit reporting company, or CRC, and credit reporting agency, or CRA, are used interchangeably herein. These terms and their associated acronyms refer to companies that provide credit file data as a service, for example, Equifax, TransUnion and Experian.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3 illustrates a set of classifications of financial accounts in accordance with one embodiment;

DETAILED DESCRIPTION

Figure 1:
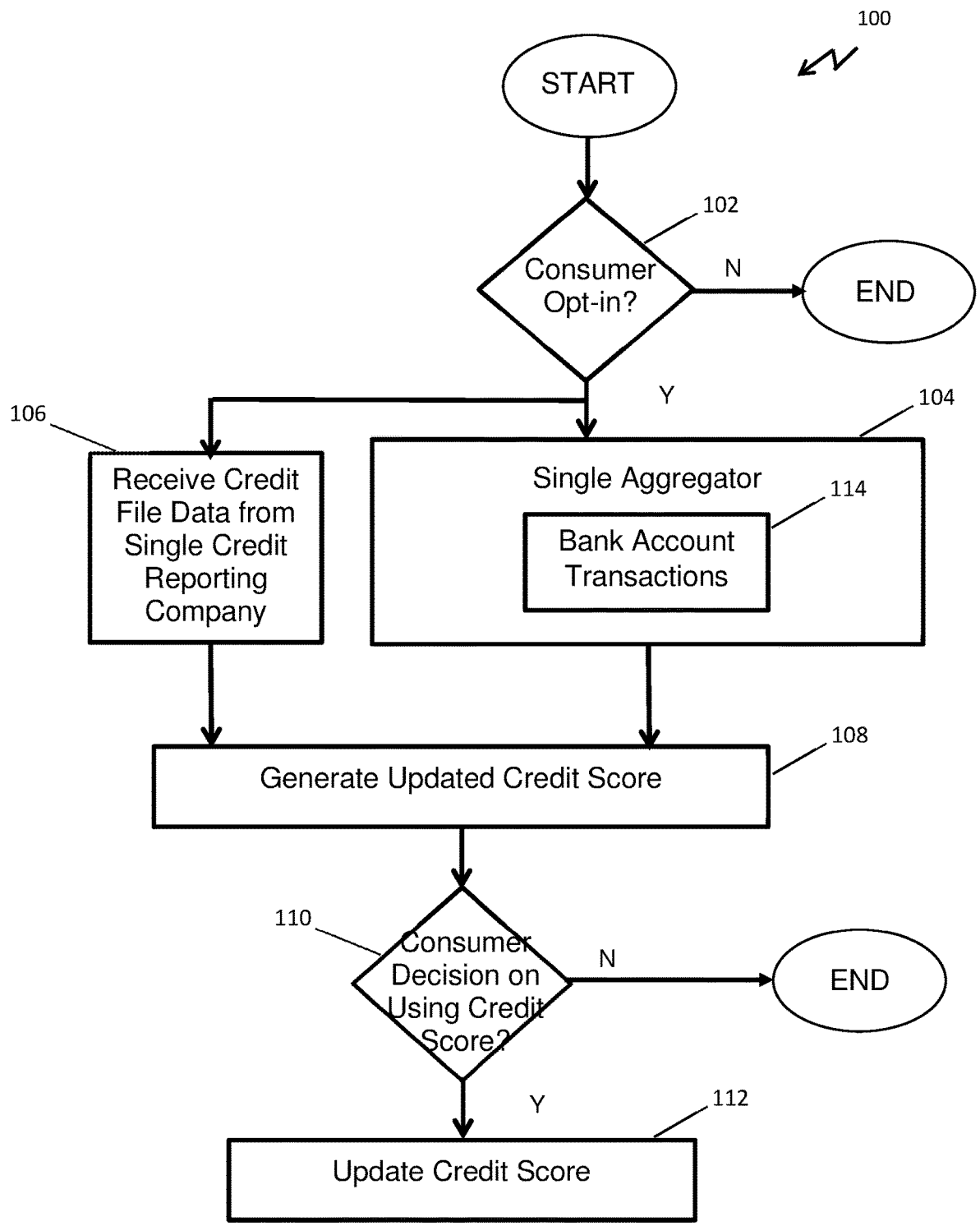
FIG. 1 illustrates a process to generate an updated credit score according to the prior art.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 2:
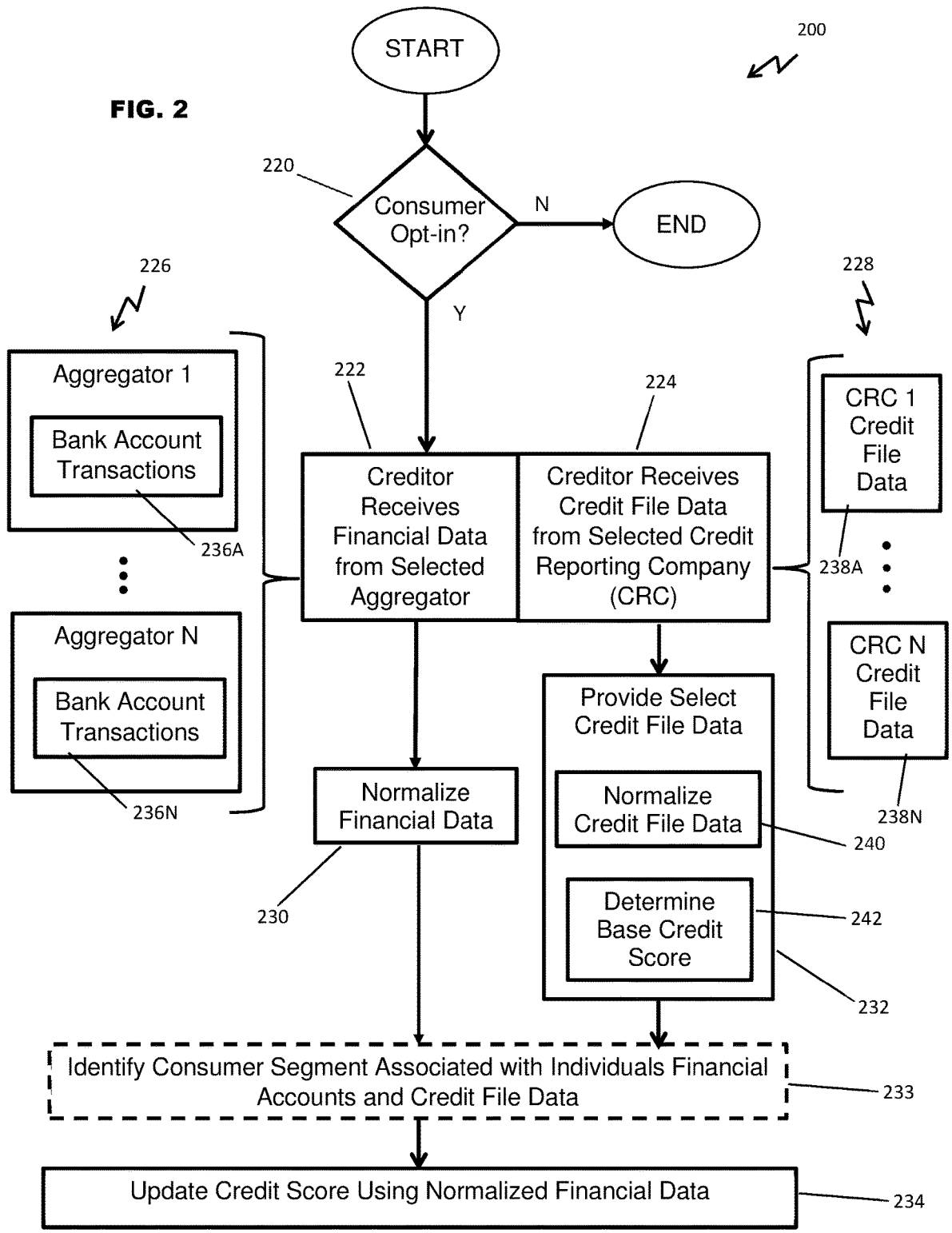
FIG. 2 illustrates a flow diagram of a process to generate an updated credit score in accordance with one embodiment.

Referring now to FIG. 2, a flow diagram of a process 200 to generate an updated credit score is illustrated in in accordance with various embodiments. According to some embodiments, the generation of the updated credit score includes the use of a combination of consumer permissioned financial data provided by any one of a plurality of aggregators in combination with credit file data received from any one of a plurality of credit reporting companies. In various embodiments, the process 200 includes a normalization of the consumer permissioned financial data to establish the value of attributes employed in the credit scoring model despite differences in the data structure employed by the respective aggregators. Further, according to some embodiments, the process 200 includes a normalization of credit file data from any one of a plurality of credit reporting agencies. The result is a process that provides creditors with the flexibility to generate an updated credit score using consumer permissioned financial data sourced from any of a plurality of aggregators. Further, the process provides creditors with the ability to generate an updated credit score using credit file data sourced from any of a plurality of credit reporting companies where the credit file data is normalized to address differences in the format of data, the identification of data and the organization of data found across the plurality of credit reporting companies. This results in updated credit scores that increases the accuracy of credit scores and allows for apples-to-apples comparison of credit scores.

In various embodiments, the process 200 includes actions and decision points. According to the illustrated embodiments, the actions include an act of receiving financial data 222, an act of receiving credit file data 224, an act of normalizing the financial data 230, an act of providing select credit file data 232, an act of identifying a consumer segment 233, and an act of generating an updated credit score 234. According to various embodiments, the act of providing select credit file data 232 includes an act of normalizing credit file data 240 and an act of determining a base credit score 242. According to the illustrated embodiment, the process includes a decision point in an act of providing a consumer opt-in 220. In some embodiments, the act of identifying a consumer segment 233 is optionally included as is described in greater detail below.

According to the illustrated embodiment, the act of receiving financial data 222 includes a receipt of consumer permissioned financial data from any one of a plurality of aggregators 226 including an Aggregator 1 through an Aggregator N (where N is an integer). Each of the plurality of aggregators include data concerning a plurality of bank account transactions 236, for example, a first plurality of bank account transactions 236A available in a data format, data identification and data organization unique to Aggregator 1 and a second plurality of bank account transactions 236A available in a data format, data identification and data organization unique to Aggregator N. As is described in greater detail below, the differences found in the format of the data, the identification of the data and the organization of the data between aggregators can include a variety of aspects concerning the data structure employed by each.

According to the illustrated embodiment, at that act of receiving credit file data 224 credit file data is received from any one of a plurality of credit reporting companies 228 including a first credit reporting company 238A (CRC 1), through a second credit reporting company 238N (CRC N), again where N is an integer. Each of the plurality of credit reporting companies include credit file data for the selected consumer, for example, an identification of credit accounts such as credit cards and mortgages, payment histories of the accounts, balances owed and account ages. Here too, the differences found in the format of data, the identification of data and the organization of data between different credit reporting companies (for example, Experian, TransUnion, and Equifax) can include a variety of aspects concerning the data structure employed by each.

The process 200 includes the act of normalizing the consumer permissioned financial data 230 to provide the flexibility to source the financial data from any one of the plurality of aggregators 226. The process 200 can also include the act of normalizing credit file data 240 to provide flexibility to source the credit file data from any one of the plurality of credit reporting companies.

According to the illustrated embodiment, the process 200 starts at the act of providing a consumer opt-in 220. Here, a consumer seeking credit is provided with an ability to opt-in to select the use of consumer permissioned financial data (for example, data for one or more demand deposit accounts) in the generation of an updated credit score. If the consumer chooses to not permit the use of consumer permissioned data, the process 200 ends. Where the consumer opts-in, the process moves to the act of receiving consumer permissioned financial data 222 and the act of receiving credit file data 224. According to the illustrated embodiment, the acts of receiving consumer permissioned financial data 222 and receiving credit file data 224 occur simultaneously. Because the two acts 222, 224 can be completed independent of one another, the sequence and timing of the two acts 222, 224 can vary in different embodiments. For example, the two acts 222, 224 can be performed with the act of receiving consumer permissioned financial data 222 being completed in advance of the act of receiving credit file data 224 or vise versa. The two acts 222, 224 can be completed in parallel or in series relative to one another provided that the information provided by the two sources of data (aggregators 226 and CRCs 228 is available when the process moves to the act of generating an updated credit score 234.

A credit scoring model operates using the same set of attributes regardless of the source of the data from which the values of the various attributes are established. Prior approaches are only compatible with a single data structure from a single aggregator. In contrast, embodiments described herein include processing to normalize data in otherwise incompatible data structures to allow a credit scoring model to operate with aggregated consumer permissioned financial data from any one of a plurality of aggregators. The process 200 is suitable for generating a credit report for a first consumer using aggregated consumer permissioned financial data received from any one of the plurality of aggregators 226. Generally, however, in each instance where the updated credit score is generated, the process 200 employs consumer permissioned financial data sourced from only a selected one of the plurality of aggregators 226. For example, the creditor that is evaluating the consumer's creditworthiness may elect to employ data from a preferred aggregator included in the plurality of aggregators 226. A different creditor (or the same creditor at a different point in time) may elect to evaluate the creditworthiness of the same consumer with data from a different aggregator included in the plurality of aggregators 226.

The credit scoring model operates on a set of attributes whose values are established using the information provided in the consumer permissioned financial data. While each aggregator may provide the same general data, the actual data structure employed is unique to each of the respective plurality of aggregators 226. At the act of normalizing the consumer permissioned financial data 230, the consumer permissioned financial data received from the selected aggregator is processed to determine attribute values for the credit scoring model regardless of the differences in the data structures employed by different aggregators.

Differences can include the identification of fields (i.e., field names or field labels), the format of data included in the fields, the availability/existence of a selected field, and the terminology employed in the content of the fields. As one example, a first aggregator may use the term "CD" to identify an account type for a certificate of deposit account. A second aggregator may use the term "INVESTMENT" to identify an account type for the same account or another certificate of deposit account. Here, different aggregators employ different terminology to describe the same attribute value found in a data field common to each, the data field "account type." Further in some instances one aggregator may not provide the same information regarding an account as another aggregator. For example, aggregators may include any or all of an account age in months, an account open date, a date the account is first seen in the financial data and a date of an account's oldest transaction.

According to some embodiments, the act of normalizing consumer permissioned financial data 230 includes employing a classification system to convert the different terminology employed by different aggregators to common terminology employed in the credit scoring model. Referring to FIG. 3, a set of classifications of financial accounts is illustrated in accordance with one embodiment. FIG. 3 includes a first set of classifications 340 for a first aggregator, a second set of classifications 342 for a second aggregator and a third set of classifications 344 for a third aggregator. In each, the classification system is employed to classify the information included in the respective aggregator's account code field.

Appearing in the leftmost column of the first set of classifications 340, the account types include a 401K Retirement Plan account, a Certificate of Deposit account, a Mortgage account, a Checking Account, and a Credit Card account. These account types are provided as examples, the classification process included in the act of normalizing 230 is not limited to either the account type field or the account types included in FIG. 3. The terminology employed by Aggregator 1 appears in the center column of the first set of classifications 340 where the respective account types are identified as follows: "401K" for the 401K Retirement Plan account; "cd" for the Certificate of Deposit account; "mortgage" for the Mortgage account; "checking" for the Checking Account; and "creditCard" for the Credit Card account. The terminology employed by Aggregator 2 appears in the center column of the second set of classifications 342 where the respective account types are identified as follows: "INVESTMENT" for the 401K Retirement Plan account; "INVESTMENT" for the Certificate of Deposit account; "MORTGAGE" for the Mortgage account; "CHECKING" for the Checking Account; and "CREDIT_CARD" for the Credit Card account. The terminology employed by Aggregator 3 appears in the center column of the third set of classifications 344 where the respective account types are identified as follows: "401K" for the 401K Retirement Plan account; "CD" for the Certificate of Deposit account; "MORTGAGE" for the Mortgage account; "CHECKING" for the Checking Account; and "CREDIT" for the Credit Card account.

The aggregator account codes provided in the three sets of classifications 340, 342, 344 illustrate some of the variance that is found in the terminology used by different aggregators to describe the same financial product. For example, Aggregator 2 identifies both the 401K Retirement Plan account and the Certificate of Deposit account with a general identifier "INVESTMENT." There are also differences in the identification (or data labeling) between aggregators. For example, the account type Credit Card is labeled as "creditCard" by Aggregator 1, as CREDIT_CARD by Aggregator 2, and as CREDIT by Aggregator 3.

The classification operations performed at the act of normalizing the financial data 230 address both differences in form of the data and differences in the substance of the data found between different aggregators. The rightmost column of three sets of classifications 340, 342, 344 illustrate the results of the classification of account type data. According to the illustrated embodiment, the classification system operates to provide a common class identifier across aggregators for each account type. For example, the respective account types are identified as follows: "INV" for the 401K Retirement Plan account; "SAV" for the Certificate of Deposit account; "CRD" for the Mortgage account; "DDA" for the Checking Account; and "CRD" for the Credit Card account. The class identifier is employed as an attribute by the credit scoring model. The classification provides a translation of the different content and form of account type data to a universal data format, labeling and type suitable for processing at the act of identifying a consumer segment 233 (when included in the process 200), and the act of generating an updated credit score 234.

Figure 4:
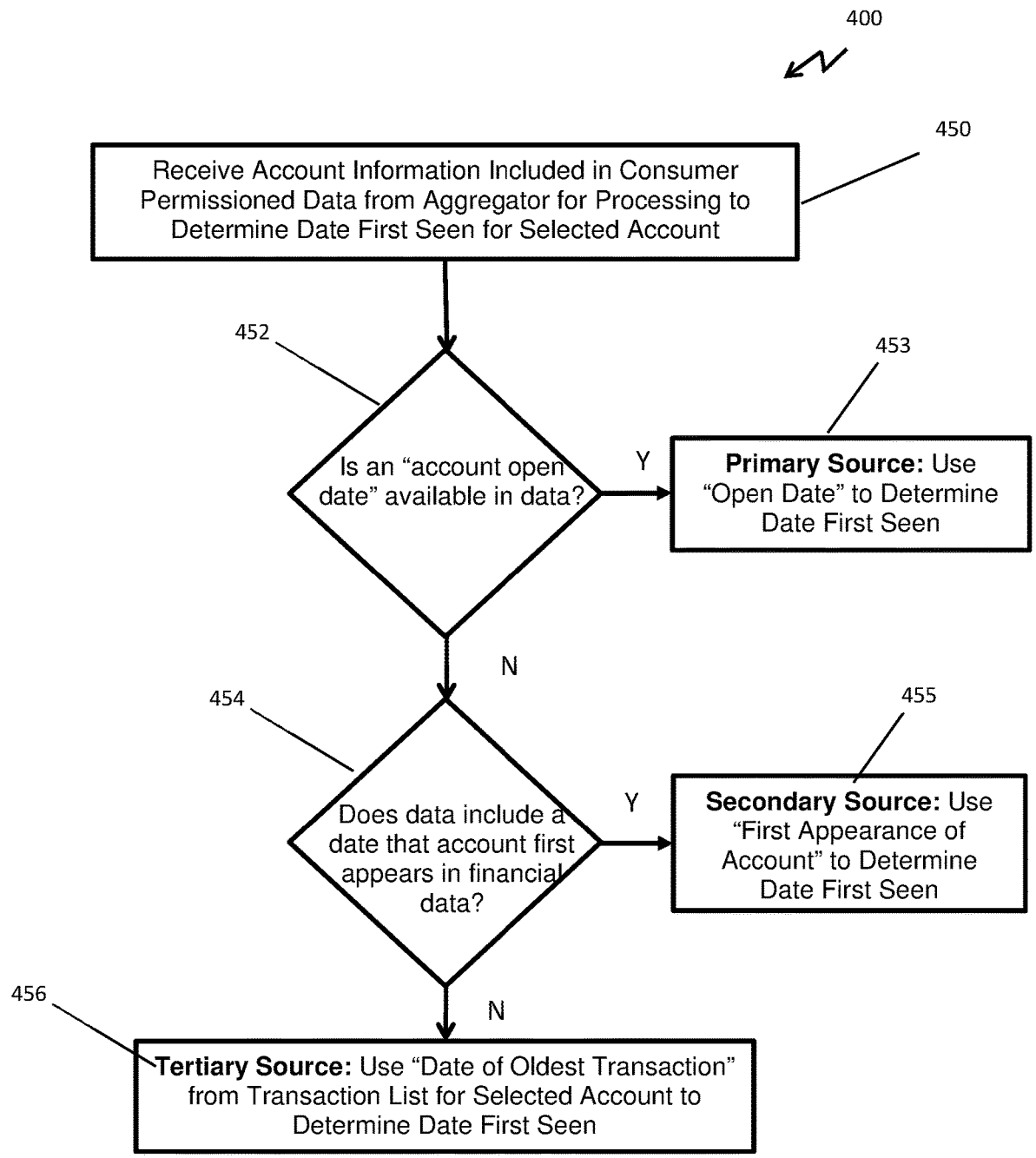
FIG. 4 illustrates a flow diagram of a process to normalize financial data in accordance with one embodiment.

Referring now to FIG. 4, another example is provided concerning the operations performed at the act of normalizing the financial data 230. In various embodiments, the process 400 includes actions and decision points. According to the illustrated embodiments, the actions include an act of receiving account information 450, an act of employing a primary source of data 453, an act of employing a secondary source of data 455 and an act of employing a tertiary source of data 456. The process 400 includes the decision points including an act of determining an availability of a first source of information 452 and an act of determining an availability of an alternate source of information 454.

In general, the process 400 determines a value of an attribute that is then employed in the credit scoring model. According to the illustrated embodiment, the attribute is the Date First Seen. For example, the length of time the consumer has maintained a demand deposit account or a credit account. Here, an account open date is employed as a primary source of data for the Date First Seen attribute, a date first seen is employed as a secondary source of data for the Date First Seen attribute and a date of oldest transaction is employed as a tertiary source of data for the Date First Seen attribute.

According to the illustrated embodiment, the process 400 begins at an act of receiving account information included in consumer permissioned data from aggregator for processing to determine an age of selected account 450. The act of receiving account information 450 provides selected data received from the aggregator, that is, data with information that may assist in determining a value of the Date First Seen attribute. The process 400 moves to the act of determining an availability of a primary source of data 452 in the consumer permissioned financial data provided by the selected aggregator. Here, the account open date is the primary source. If the primary source of data is available for the Date First Seen attribute, the process moves to the act of employing the primary source of data 453 to determine an age of the account. For example, the Date First Seen may be determined as a difference between the account open date and the current date.

According to the illustrated embodiment, the process 400 can screen the consumer permissioned financial data for a secondary source of data, a tertiary source of data or other sources and employ the data provided by the source that is most effective in determining the value of the attribute that the process 400 is directed to finding. That is, the primary source may allow a more direct determination of the value of the attribute relative to either a determination made with the secondary source of data or the tertiary source of data. The primary source can also increase the accuracy of the attribute value relative to the attribute value as determined using either the secondary source or the tertiary source. The primary source may also increase efficiency by reducing the quantity of data inputs and/or complexity of the process 200 because it requires less data to determine the attribute value than an alternate secondary source. Similarly, the secondary source of data may be preferred over the tertiary source of data because the secondary source offers one or more of the preceding benefits relative to the tertiary source.

If an account open date is unavailable, the process 400 moves to the act of determining an availability of an alternate source of data 454. If the secondary source of data is available, the process 200 moves to the act of employing the secondary source of data 455. If the secondary source of data is unavailable, the process moves to the act of employing the tertiary source of data 456. In the embodiment illustrated in FIG. 4, the secondary source of data is the date that the account first appears in the consumer permissioned financial data. Where the secondary source of data is available, the value of the Date First Seen attribute can be determined as a difference between the date the account is first seen and the current date. In the embodiment illustrated in FIG. 4, the tertiary source of data is the date of the oldest transaction found in the consumer permissioned financial data in the transaction list for the selected account. With the tertiary source of data, the value of the Date First Seen attribute can be determined as a difference between the date of the oldest transaction and the current date.

The process 400 is provided as an example and similar processes including those with a different number of possible sources of information (either more or fewer than illustrated in FIG. 4) can be employed in various embodiments. Further, the overall approach illustrated by the process 400 including evaluating consumer permissioned financial data from an aggregator for a primary source of data and one or more alternate sources of data can be employed to determine a value for a wide variety of different attributes employed in the credit scoring model, for example, a wide variety of attributes different than the Date First Seen attribute. A single instance of the act of normalizing financial data 230 can include multiple different processes employed to establish values for different attributes for data received from the aggregator at the act of receiving data from the selected aggregator 226.

Following the act of normalizing the consumer permissioned financial data 230, the process moves to the act of identifying a consumer segment 233 where included in the process 200, or alternatively, to the act of generating the updated credit score 234. These two acts each also employ the select credit file data that is provided at the act of 232. Credit file data is conventionally employed in generating credit scores. However, most credit scoring models are limited to a single CRC as the source of credit file data. For example, each of Experian, TransUnion, and Equifax employ different data structures to store credit file data. Most current credit scoring models can only establish the values of the attributes employed in the respective credit scoring model with data that is received in one known data structure. These approaches do not permit the use of data received from any one of the different CRCs given the different data structures employed by each.

According to various embodiments, the process 200 permits the use of credit file data from any one of the plurality of CRCs 228. Because the process 200 can operate with data sourced from any one of the plurality of different CRCs, the act of normalizing the credit file data 240 is included in the act of providing select credit file data for use in generating an updated credit score at the act 234. As is described further below, the act 240 allows values for the various attributes to be established in the credit scoring model regardless of which of the known data structures is employed by the CRC that provides the credit file data. Generally, in each instance where the updated credit score is generated, the process 200 employs credit file data sourced from only a selected one of the plurality of credit reporting companies 228. For example, a first instance a first creditor can employ a credit score for a first consumer where the credit score is generated using credit file data that is only sourced from Experian. In a second instance, a second creditor can employ a credit score for the same consumer where the credit score is generated using credit file data that is only sourced from TransUnion.

The act of providing select credit file data 232 also includes the act of determining a base credit score 242 as a part of the overall process 200. According to this embodiment, the base credit score is generated without the use of the consumer permissioned financial data received from the aggregator.

According to the illustrated embodiment, the act of providing select credit file data 232 can include a limited set of credit file data (values for attributes) to be employed in the act of generating the updated credit score 234 and the base credit score generated with normalized credit file data. According to one embodiment, the act of providing select credit file data 232 does not provide the base credit score but instead provides a data input update with the updated credit score data to be employed in generating the updated credit score.

In other embodiments, the process 200 may be established for use only with credit file data sourced from a single CRC, for example, the first CRC 238A. For example, where the creditor and/or the operator of the credit scoring model has an established relationship with a single CRC. According to this embodiment, the act of providing select credit file data 232 may not include the act of normalizing credit file data 240.

At the act of generating the updated credit score 234, the normalized consumer permissioned financial data and select credit file data are employed to generate an updated credit score. Here, the credit scoring model operates to process the consumer permissioned financial data and select credit file data to identify a value of the attributes employed in the credit scoring model. The credit scoring model employs these values to generate the updated credit score for the consumer.

According to some embodiments, the process 200 includes the act of identifying a consumer segment 233. Here, attributes determined with the normalized consumer permissioned financial data and the select credit file data are processed using a decision tree to determine based on various attribute values a consumer segment that the consumer belongs within. For example, a first consumer segment may result where the consumer permissioned financial data and credit file data demonstrate that the consumer has a large number of credit cards and/or multiple auto loans. A second consumer segment may result for a consumer with no auto loans, no mortgages and account ages that are less than one year. For each of the respective consumer segments, a credit scoring outcome is determined using a different set of weighted values employed with the overall credit scoring model relative to the weightings applied for other consumer segments. The segmentation is employed to identify a likelihood of default more accurately by the consumer.

Figure 5:
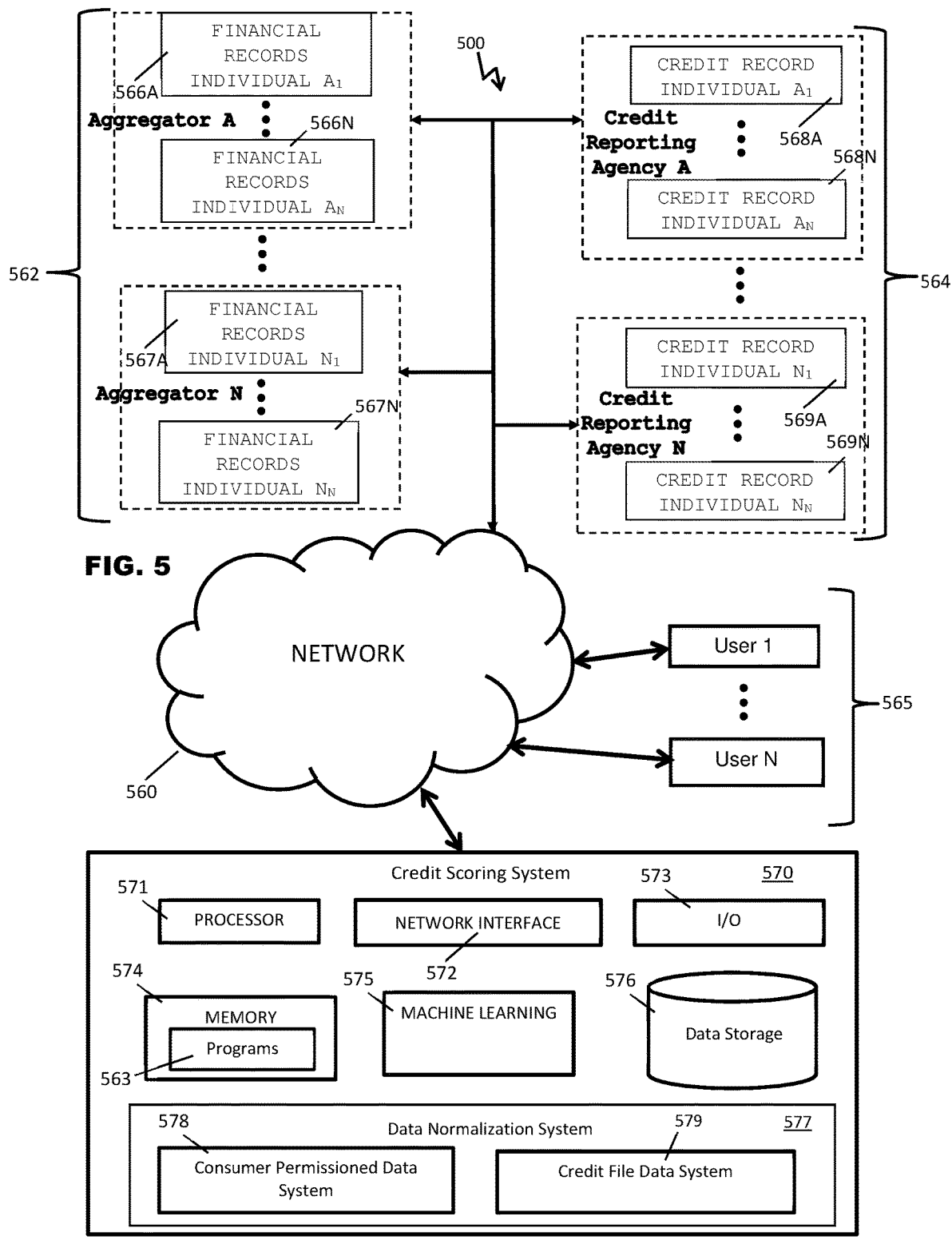
FIG. 5 illustrates a system including a network operating environment for generating an updated credit score in accordance with one embodiment.

Referring now to FIG. 5, a system 500 for generating an updated credit score with consumer permissioned financial data is illustrated in accordance with various embodiments. According to the illustrated embodiment, the system 500 includes a network 560, a plurality of aggregators 562 including Aggregator 1 through Aggregator N, a plurality of credit reporting agencies 564 including Credit Reporting Agency A through Credit Reporting Agency N, a plurality of users 565 and a credit scoring system 570. The credit reporting agencies are also referred to as CRAs in the description below.

Each of the plurality of aggregators can generate any of a plurality of consumer permissioned financial records with each record associated with a selected consumer. For example, Aggregator A provides financial records including a financial record 566A for individual $A_1$ through a financial record 566N for individual $A_N$. Similarly, Aggregator N provides financial records including a financial record 567A for individual $N_1$ through a financial record 567N for individual $N_N$. As will be apparent to those of ordinary skill in the art in view of the disclosure provided herein, each of the plurality of aggregators can generate financial records for the same individuals as one another or different individuals. For example, a consumer can apply for credit with multiple credit sources where a first creditor receives consumer permissioned financial data for the consumer from a first aggregator and a second creditor receives consumer permissioned data for the consumer from a second aggregator.

Each of the plurality of credit reporting agencies can generate any of a plurality of credit file records with each record associated with a selected consumers. For example, Credit Reporting Agency A provides credit file records including a credit file record 568A for individual $A_1$ through a credit file record 568N for individual $A_N$. Similarly, Credit Reporting Agency N provides financial records including a financial record 567A for individual $N_1$ through a financial record 567N for individual $N_N$. As will be apparent to those of ordinary skill in the art in view of the disclosure provided herein, each of the plurality of credit reporting agencies 564 can generate credit file records for the same individuals as one another or different individuals. That is, multiple credit reporting agencies can maintain credit files the same consumer, for example, each of Equifax, Transunion and Experian can maintain a credit file for the same consumer.

The plurality of users 565 includes any of user 1 through user N and can include a variety of different types of users. For example, a first type of user can include a system administrator or another operator of the credit scoring system 570, a second type of user can include end users such as creditors seeking credit scores for consumers, a third type of user can include consumers themselves who communicate with creditors via the network 560, a fourth type of user can include the plurality of aggregators 562, a fifth type of user can include the plurality of credit reporting agencies 564 such as credit bureau or data analytics company that provide credit scores or other data concerning credit worthiness as a service offering. Other types of users can include financial institutions that maintain demand deposit accounts.

In general, the first type of user includes a system administrator or other operator of the credit scoring system 570 who is responsible for maintaining and operating the system 570 and providing access to all the plurality of users 565 via the network 570. For example, the resources included in the credit scoring system 570 can be provided as a web application (a SaaS system) employed by end users to generate and review credit worthiness of individual consumers. According to further embodiments, all or some of the resources included in the credit scoring system 570 can be accessed via a native mobile application. Whether provided as a web application or a mobile application, one of ordinary skill in the art, in view of the disclosure provided herein, will recognize that the credit scoring system 570 includes separate secure accounts accessible for each of the plurality of creditors, respectively. Discrete, secure accounts can also be provided for others of the plurality of users 565 depending on the embodiment.

In the illustrated embodiment, the credit scoring system includes a processor 571, a network interface 572, I/O 573, a memory 574, and data storage 576. The memory 574 includes at least one program 563. Depending on the embodiment, the credit scoring system 570 can include one or more of a variety of computing devices such as a general purpose computer such as a PC, a laptop, a tablet computer or other computing device. The resources included in the credit scoring system 570 can be hosted on one or more servers accessible to the system operator and the plurality of users 565 via the network 560. The network interface 572 is employed for communication between the credit scoring system 570 and other elements connected to the network 560 including the plurality of users 565 and the user devices (not illustrated) such as desktop computing devices, laptop computing devices and handheld computing devices such as smart phones and tablet computers.

The memory 574 can store the programs 563 that when executed by the processor 571 operate to: receive credit file data from credit reporting agencies; generate base credit scores using information provided by credit file records; obtain consumer permission and credentials to access information in demand deposit accounts via the aggregators; match the consumer permissioned financial data and credit file data for a consumer with the consumer's request for credit (for example, match with the consumer's loan application); pass the base credit score data, select credit file data and consumer permissioned financial account data to an API of the updated credit scoring model; return an updated credit score including adjustments resulting from an inclusion of the consumer permissioned financial data in the credit scoring model; and share the adjusted score and adjustment with the creditor (for example, a lender). According to various embodiments, the consumer permissioned financial data is normalized to account for differences in data structures employed by different aggregators. In further embodiments, the credit file data is also normalized to account for differences in data structures employed by different credit reporting companies.

According to some embodiments, the credit scoring system 570 also includes an expanded credit scoring system. The expanded credit scoring system provides a tool for users to generate credit scores using enhanced performance definitions in a credit scoring process that expands the population of consumers for whom a credit score is available. In various embodiments, the preceding is accomplished in a manner that maintains credit risk standards for the newly scored consumers.

The I/O 573 can include any of the display in which a graphical user interface (GUI) is presented to the user, a touchscreen controller where, for example, the display is a touchscreen display, or alternatively, a trackpad or mouse used to move a cursor within a GUI. According to further embodiments, the I/O can include an audio system employed with a speech recognition system to allow hands-free interaction with the GUI.

In various embodiments, a data visualization system (not illustrated) in combination with a census-based demographics system (not illustrated) is employed by users to render a map including geographic sub-regions with associated population-based credit score metrics for display and navigation in a graphical user interface. The user interface can be employed by an end user to operate the credit scoring system 570 to perform steps to generate credit scores for an expanded population of consumers across a known geographic region, correlate the credit score data across a plurality of geographic sub-regions located within the known geographic region, generate a plurality of population-based credit score metrics for each of the geographic sub-regions and render a data visualization including a map of the geographic sub-regions highlighted to illustrate relative values of selected population-based credit score metrics. According to some embodiments, a color gradient is employed in the data visualization as a visual reference indicative of the value of a selected population-based credit score metric in each of the displayed sub-regions relative to others of the displayed sub-regions.

According to some embodiments, the data storage 576 stores information concerning various aspects of the credit scoring system 570. For example, the data storage 576 can store consumer permissioned financial data received from any of the plurality of aggregators 562, credit file data received from any of the plurality of credit reporting agencies 564, attributes determined using the data received from plurality of aggregators and the plurality of credit reporting agencies, credit scores and other values employed in generating updated credit scores. The data storage 576 can also store U.S. census data received from a source of U.S. census data. Depending on the embodiment, the data storage 576 can include any of a relational database, object-oriented database, unstructured database, or another type of database. Further, the data storage 576 can be included in any aspect of a memory system, such as in RAM, ROM or disc, and may also be separately stored on one or more dedicated data servers included in the credit scoring system 570.

According to the illustrated embodiment, the credit scoring system 570 also includes a machine learning system 575. As described in greater detail in U.S. Pat. No. 11,270,376 the machine learning system operates in a modeling process to identify relative credit risk that is employed in an expanded credit scoring model. For example, the modeling can include bootstrapping, random forest trees or other statistical techniques and processes used to determine a predictive value of different consumer behaviors that are processed in the expanded credit scoring model. The machine learning system 575 assists in providing an expanded credit scoring model to universally expand credit risk scoring, using information and scoring consumers that previously were unscored due to the rigid and outdated constructs employed in conventional credit scoring models. According to various embodiments, the methods allow scoring to expand homogeneous segments, which include, but are not limited to, individuals who are new credit users, individuals who have dormant credit activity, and individuals who have no credit activity. In addition, the method allows a design of attributes that impact the credit risk of an individual to include any of the following or other attributes: revolving credit products; credit inquiries; installment credit products; collections; payment history; and public records. In various embodiments, the preceding approaches are employed in generation of updated credit scores determined using consumer permissioned financial data. The disclosure of U.S. Pat. No. 11,270,376, entitled "Method and System for Enhancing Modeling for Credit Risk Scores," issued Mar. 8, 2022, is herein incorporated by reference in its entirety.

The credit scoring system 570 includes a data normalization system 577. According to the illustrated embodiment, the data normalization system 577 includes a consumer permissioned data system 578 and a credit file data system 579. The overall operation of the data normalization system 577 provides data in a format from which attributes employed in the credit scoring model of the system 570 can be directly determined. As described herein, a variety of approaches can be employed to normalize the consumer permissioned financial data and the credit file data, respectively, depending on the embodiment.

In some embodiments, the consumer permissioned data system 578 includes a variety of different data processing techniques, to address one or more of the differences in data structures employed by the plurality of aggregators, respectively. For example, the consumer permissioned data system 578 can include a classification system as described with reference to FIG. 3 above. The classification system can be employed to translate information included in one or more data fields provided by aggregators into a common set of identifiers that can be employed as attribute values in the credit scoring model. Other data processing techniques, for example, as illustrated and described with reference to FIG. 4, permit a value of an attribute to be determined despite inconsistencies between aggregators in the availability of various types of information concerning the value.

In various embodiments, the source of credit file data includes one or more credit reporting agencies who collect and maintain information for credit reports. The information provided in the credit file data can include, for example, information on a consumer's accounts such as: their payment history; outstanding balances; the length of credit history; applications for new credit accounts; and types of credit accounts (i.e., mortgages, car loans, credit cards). According to one embodiment, the source of credit file data includes each of the three major credit reporting agencies, Experian, TransUnion, and Equifax. In some embodiments, the credit file data system 579 includes a variety of different data processing techniques, respectively, to address one or more of the differences in data structures employed by the plurality of credit reporting agencies, respectively. For example, definitions employed in the data structures of the three major CRAs, respectively, are often inconsistent or incompatible with one another. This is the case for many consumers whose credit file is housed by more than one of the three CRAs. Unless properly addressed, these differences can result in meaningfully different credit scores for the same consumer depending on the identity of the credit reporting agency that provides the credit file data used to generate the updated credit score. Here, a normalization (or leveling) process yields consistent and equitable characteristic definitions across multiple sources of credit file data. When normalized the same data from multiple sources it is interpreted in the same manner. So, if the same data is reported from more than one credit reporting agency, it will be interpreted the same way in the credit scoring model. That is, the data will be properly recognized when establishing values for the various attributes employed in the credit scoring model.

According to some embodiments, one or more data processing techniques are employed that are comparable to one another for the consumer permissioned financial data and for the credit file data. For example, a first classification systems can be used in the consumer permissioned data system 578 and a second classification system can be employed in the credit file data system 579. According to one embodiment, the second classification system is different than the first classification system.

In embodiments where a census-based demographics system is employed in the system 570, the updated credit score metrics provided by the credit scoring system can be applied to geographic regions and sub-regions. For example, population-based credit score metrics can be applied to any geographic sub-region for which census data is available. In various embodiments, the geographic sub-regions can include any of PUMAs, CBSAs and congressional districts geographic sub-region types. However, the census data can also be applied to county or zip code geographic sub-regions. This allows the credit scoring system 570 to provide the preceding with demographic information for the newly scored population at a level of geographic granularity that is otherwise unavailable. These embodiments can provide users with a data visualization that allows for simple, direct and intuitive navigation of substantial amounts of quantitative information on both updated credit score metrics and demographics. In various embodiments, a graphical user interface rendered in the user's computing device allows users to quickly navigate and identify the most significant credit opportunities whether the opportunities are directed to providing credit to the newly scored population generally, or more specifically, to individuals in historically disadvantaged groups. In some embodiments, the opportunities for historically disadvantaged groups are further increased because the availability of consumer permissioned financial data provides a more accurate credit score that can highlight the creditworthiness of an individual who might otherwise be overlooked by creditors.

The components included in the credit scoring system 570 can be coupled by one or more communication buses or signal lines (not illustrated). The communication buses can be used for the communication of instructions/commands and data between the illustrated components and between the illustrated components and other components included in the system 570 depending on the embodiment.

In general, the network 560 can include either or both of local-area networks (LANs), wide area networks (WANs), wireless communication, wired communication and may include the Internet. According to a further embodiment, the network 560 provides access to one or more remote devices, servers, application resource management and/or data storage systems. For example, the network 560 can allow communication between any of the credit scoring system 570 and computing devices possessed by the plurality of end users 565. In general, the system 570 provides for communication of the illustrated components with one another and/or with any of the other resources and devices coupled to the network 560. Communication can occur using any of Wi-Fi networks, Bluetooth communication, cellular networks, satellite communication, and peer-to-peer networks available either alone or in combination with one another via the network 560. Depending on the embodiment, the network 560 may be any type and/or form of network known to those of ordinary skill in the art capable of supporting the operations described herein. Thus, other communication protocols and topologies can also be implemented in accordance with various embodiments.

The system 500 can operate using several different operating models that employ consumer permissioned financial data, for example, depending on the approach selected by the creditor. Unlike prior approaches, each of these operating models allows the user of consumer permissioned financial data from any one of a plurality of different aggregators. In each, a normalization of the consumer permissioned financial data addresses differences in the data structures employed by different aggregators such that the credit scoring model can work with the data provided by each. Further, the operating models can also employ a normalization process to levelize the credit scores generated using data from any of the credit reporting agencies. Additionally, and unlike prior approaches, the updated credit score is employed by the lender to evaluate the creditworthiness of the consumer regardless of whether the updated credit score improves a likelihood that the consumer will be approved for credit. According to some embodiments, there is no ability for the consumer to opt-out once the authorization to employ consumer permissioned financial data is provided with the credentials. That is, the consumer cannot review the updated credit score and then self-select by choosing which of the two scores to use in the credit approval process. According to these embodiments, the updated credit score is employed and gives the lender the most accurate available information on which to base their credit-approval decision.

According to one embodiment, a consumer goes to a lender website to apply for a personal loan on-line. The consumer provides their personal information, for example, their personal biographical information. The consumer's credit score is generated but is too low to qualify them for a desired loan product. The consumer is provided with an opportunity to link one or more demand deposit accounts to the credit application, for example, one or more bank accounts. If the consumer agrees to participate, they then select their financial institution using the web or mobile software application. The consumer is informed of the type of data that is shared, for example, account details, balances and transactions and personal and account ownership info. The consumer provides the credentials for the account, for example, a user ID and a password. The credentials are passed to the application operated by the credit scoring system 570. The credentials are communicated from the credit scoring system 570 to an aggregator of consumer permissioned financial data by the credit scoring system 570. The consumer permissioned financial data is received by the credit scoring system where it is normalized and processed in generating an updated credit score. The updated credit score is evaluated by the lender to further consider the loan application with reference to the updated credit score.

According to another embodiment, a consumer goes to a lender website to apply for a personal loan on-line. The consumer provides their personal information, for example, their personal biographical information. The consumer is preapproved for an amount of credit (for example, a size of their loan). The consumer is provided with an opportunity to link one or more demand deposit accounts to the credit application for an opportunity to receive one or more enhanced loan options. If the consumer agrees to participate, they then select their financial institution using the web or mobile software application. The consumer is informed of the type of data that is shared, again, account details, balances and transactions and personal and account ownership info. The consumer provides the credentials for the account, the user ID and the password. The credentials are passed to the application operated by the credit scoring system 570. The credentials are communicated from the credit scoring system 570 to an aggregator of consumer permissioned financial data by the credit scoring system 570. The consumer permissioned financial data is received by the credit scoring system 570 where it is normalized and processed in generating an updated credit score. According to some embodiments, the aggregator is selected from the plurality of aggregators by the creditor. Further, the creditor's preferred aggregator can change over time without impacting an ability to employ the credit scoring system 570 to generate an updated credit score. The updated credit score is evaluated by the lender. If the updated credit score supports one or more enhanced loan options, these new options (for example, an increased amount of credit) are presented to the consumer.

According to yet another embodiment, the use of consumer permissioned financial data is a mandatory part of the process of a lender or other creditor. Here, the loan application process integrates the request for a consumer authorization to the use of consumer permissioned financial data into the application process. For each loan application, the consumer provides their personal information and the credentials for their demand deposit account. The credentials are passed to the application operated by the credit scoring system 570. The credentials are communicated from the credit scoring system 570 to an aggregator of consumer permissioned financial data by the credit scoring system 570. The consumer permissioned financial data is received by the credit scoring system 570 from the aggregator where it is normalized and processed in generating a credit score. The credit score is evaluated by the lender. The credit options (for example, the amounts and rates for a loan) are determined by the lender based on the credit score. According to one embodiment, the credit options are automatically determined for the consumer based on the credit score.

According to still another embodiment, the consumer applying for credit may also proactively elect to link their demand deposit accounts to the credit scoring system 570. Here, the consumer goes to the creditor's web site and proactively selects an option to link their demand deposit account(s) during a sign-up process. After electing to included consumer permissioned financial data as a part of the sign-up process, the consumer is prompted to provide their personal information and their credentials for their selected demand deposit account(s). Later following their signing up with the creditor, the consumer returns to apply for credit (for example, applying for a loan). The consumer provides their personal information, for example, their personal biographical information as a part of the application process. The credentials are passed to the application operated by the credit scoring system 570. The credentials are communicated from the credit scoring system 570 to an aggregator of consumer permissioned financial data by the credit scoring system 570. The consumer permissioned financial data is received by the credit scoring system 570 from the aggregator where it is normalized and processed in generating a credit score. The credit score already adjusted with the inclusion of the consumer permissioned financial data is evaluated by the lender. According to one embodiment, the consumer is immediately approved for a loan with a loan amount automatically determined for the consumer based on the credit score.

In some embodiments, the credit scoring system 570 provides a hub for a communication of credit data and consumer permissioned financial data. This overall approach can be employed in any of the example embodiments described in the preceding paragraphs. According to these embodiments, the creditor (for example, a lender) is the point of contact with the consumer. In one embodiment, the lender operates its own or other lender-branded web or mobile software application employed by the consumer. The consumer opt in and associated credentials are communicated to the lender by the consumer with the application, the credentials are communicated via the lender application to the credit scoring system 570. The credit scoring system receives the credentials and then transmits them to a selected one of the plurality of aggregators 562. The aggregator accesses the consumer permissioned financial data and then communicates the financial data for the consumer permissioned accounts to the credit scoring system. The operator of the credit scoring system accesses credit file data (for example, from a credit reporting agency such as Equifax, Experian or TransUnion). The credit scoring system employs the combination of selected consumer permissioned financial data and selected credit file data to generate an updated credit score which is communicated to the creditor. According to some embodiments, an API is provided by the operator of the credit scoring system 570 to the creditor to facilitate the communication of data and information between the creditor and the credit scoring system 570. According to some embodiments, a provider of a credit scoring model hosts and operates the credit scoring system 570 and provides the API to creditors to integrate the functionality of the creditor's software application with the system host's software application. According to some embodiments, the operator of the credit scoring system provides base credit scores as described herein along with a quantified difference between a consumer's updated credit score and their base credit score.

The embodiments described herein facilitate credit scoring using consumer permissioned financial data received from any of a plurality of aggregators. Some of these embodiments also facilitate credit scoring using credit file data received from any of a plurality of credit agencies. In general, the data normalization establishes values for a set of attributes that can be employed in the credit scoring model used to generate the updated credit score.

Figure 6:
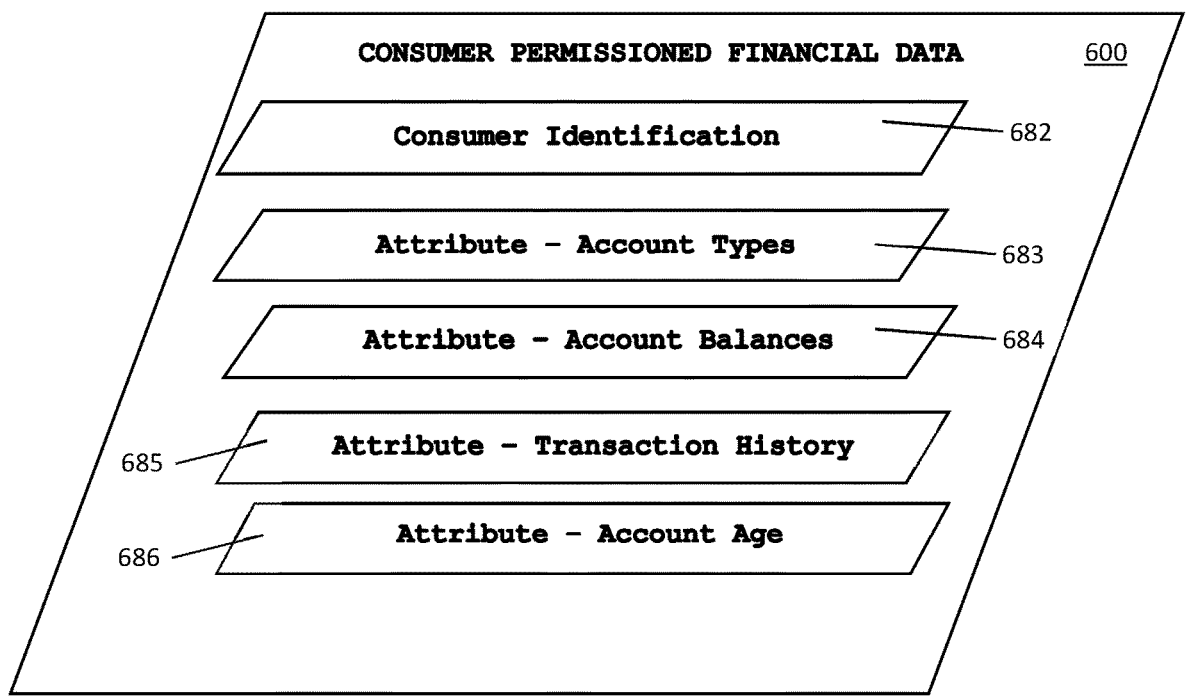
FIG. 6 illustrates a data structure for attributes determined with consumer permissioned financial data according to one embodiment.

Referring now to FIG. 6, a general data structure for attributes included in consumer permissioned financial data 600 is illustrated according to one embodiment. According to this embodiment, the data structure 600 includes a set of data fields and associated attributes that are employed in the credit scoring model. These include: a consumer identification field 682; a first attribute field 683 including an account type; a second attribute field 684 including account balances; a third attribute field 685 including a transaction history; and a fourth attribute field 685 including an account age. The consumer identification field 682 includes personal identifying information concerning a consumer, for example, biographical information including their name, address and age. The first attribute field 683 includes an account type for a selected account of the user, for example, checking, savings, money market, 401K, and IRA. The second attribute field 684 includes account balances for the selected account, for example, account balances that cover a known period of time and reflect changes resulting from one or more transactions such as payments, cash withdrawals, and deposits. The third attribute field 685 includes account transactions across a period of time, for example, a transaction or activity history that identifies transaction types such as transfers, deposits and withdrawals. The fourth attribute field 686 includes information concerning an age of the selected account such as an account opened date, a date first seen or a date of oldest transaction.

The data structure 600 of FIG. 6 illustrates a general data structure for an example set of attributes whose values are determined using normalized data from consumer permissioned accounts received from an aggregator. With reference to the process illustrated in FIG. 2, these attributes can be determined following the act of normalizing 230 and then employed to generate the updated credit score at act 234.

Figure 7:
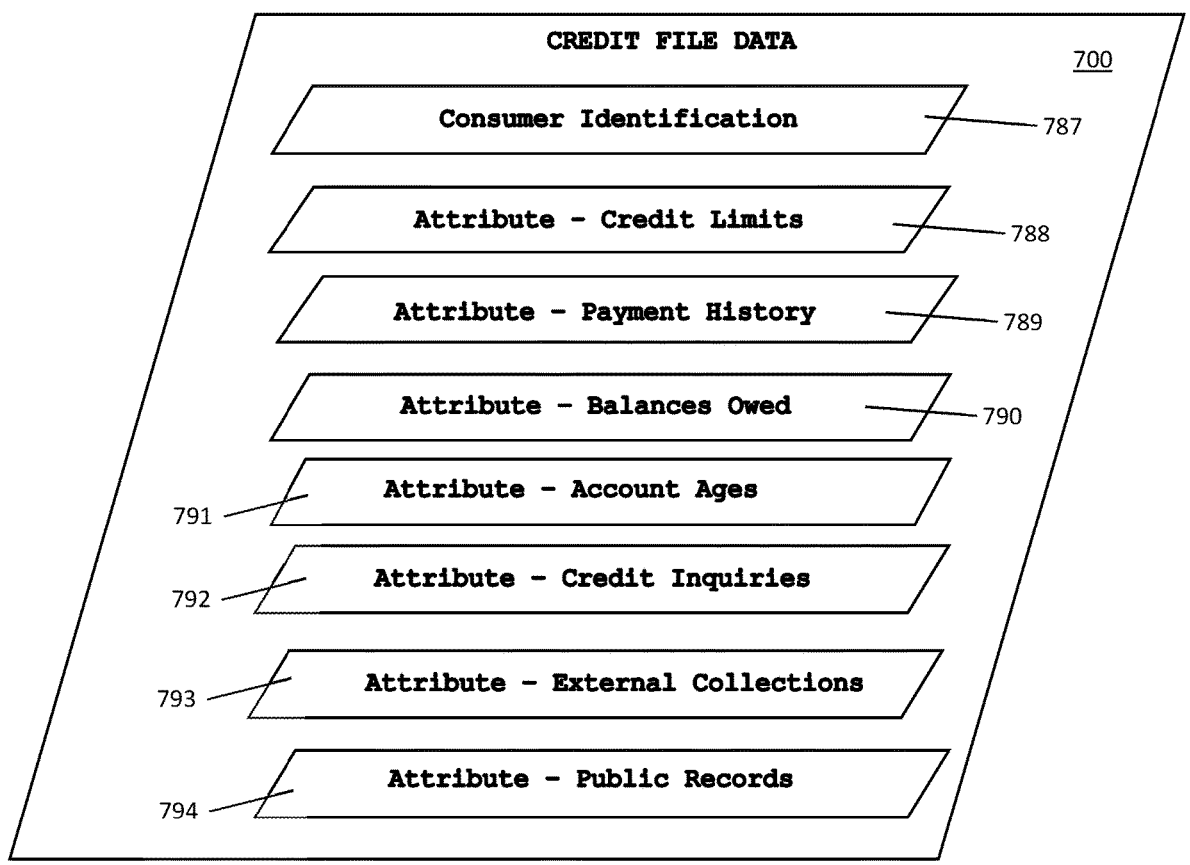
FIG. 7 illustrates a data structure for attributes determined with credit data according to one embodiment.

Referring now to FIG. 7, a general data structure for attributes included in credit file data 700 is illustrated according to one embodiment. According to this embodiment, the data structure 700 includes a set of data fields and associated attributes that are employed in the credit scoring model. These include: a consumer identification field 787; a first attribute field 788 including credit limits; a second attribute field 789 including payment history; a third attribute field 790 including balances owed; a fourth attribute field 791 including account ages; a fifth attribute field 792 including credit inquiries; a sixth attribute field 793 including external collections activities; and a seventh attribute field 794 concerning public records. The consumer identification field 787 includes personal identifying information concerning a consumer, for example, biographical information including their name, address and age. The first attribute field 788 includes the credit limits for accounts of the user, for example, credit cards and lines of credit. The second attribute field 789 the payment history for the consumer's accounts. The third attribute field 790 includes balances owed, for example, current balances across the consumer's credit accounts. The fourth attribute field 791 includes information concerning an age of the consumer's credit accounts. The fifth attribute field 792 includes information concerning any credit inquiries such as the frequency and dates of inquiries received from a credit reporting agency. The sixth attribute field 793 includes information concerning any external collections debt records on file for the consumer. The seventh attribute field 794 includes information concerning any public records such as bankruptcies involving the consumer.

The data structure 700 of FIG. 7 illustrates a general data structure for an example set of attributes whose values are determined using normalized data from credit file data received from a credit reporting agency. With reference to the process illustrated in FIG. 2, these attributes can be determined following the act of normalizing credit file data 240 and then employed to generate the updated credit score at act 234.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. Generating a credit score using consumer permissioned financial data received from any one of a plurality of aggregators is one such example. Generating a credit score using consumer permissioned financial data received from any one of a plurality of aggregators in combination with credit file data received from any one of a plurality of credit reporting agencies provides another example.

Each computer program within the scope of the claims below may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors.

Any step or act disclosed herein as being performed, or capable of being performed, by a computer or other machine, may be performed automatically by a computer or other machine, whether explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
providing, from a credit scoring computer, to a creditor computer an API to allow the creditor computer to integrate functionality provided by the credit scoring computer, the functionality including a graphical user interface for entry of credentials by a consumer and communicated to the creditor computer via a network interface of the creditor computer, the credentials including information that securely and uniquely identifies the consumer allowing access to financial data including transactions recorded in at least one demand deposit account of the consumer;

receiving, at the credit scoring computer from the creditor computer via a network interface of the credit scoring computer, the credentials provided by the consumer to permit use of consumer permissioned data including the financial data to generate a credit score for the consumer;

providing from the credit scoring computer via the network interface of the credit scoring computer the credentials to a first aggregator selected from a plurality of aggregators, the first aggregator storing the consumer permissioned data using a first data structure that employs a first set of data fields to identify different types of demand deposit accounts, each of the plurality of aggregators employing different data structures that employ a different set of data fields for the consumer permissioned data including different sets of data fields to identify different types of demand deposit accounts, respectively, the respective different set of data fields being uniquely identified by each of the plurality of aggregators;

receiving, at the credit scoring computer from the first aggregator via the network interface of the credit scoring computer, the financial data for the at least one demand deposit account, the financial data organized using the first data structure and the first set of data fields, an organization and an identification of the first set of data fields being different than an organization and identification employed for the different data structures of others of the plurality of aggregators;

on receipt of the financial data from the first aggregator, processing the financial data, by the credit scoring computer, for each demand deposit account, to automatically assign a class identifier for the demand deposit account, respectively, the class identifier converting an account-type identification established by the first aggregator to identification information that is structured for processing by the credit scoring computer where it is employed by a credit scoring model in determining attribute values and an updated credit score for the consumer;

on receipt of the financial data, screening each demand deposit account, by the credit scoring computer, to automatically locate for each of a plurality of attributes a source of data that is most effective in determining a value of a selected attribute, the value being required by the credit scoring model for determining the updated credit score, the screening including:
screening for an existence of a first data field in the financial data, and where the first data field is available, employing a first value included in the first data field to determine the value of the selected attribute;
when the first data field is unavailable, screening for an existence of a second data field in the financial data, and where the second data field is available, employing a second value included in the second data field to determine the value of the selected attribute, the second data field being a first alternate source of data for the selected attribute; and
when both the first data field and the second data field are unavailable, screening for an existence of a third data field in the financial data, and where the third data field is available, employing a third value included in the third data field to determine the value of the selected attribute, the third data field being a second alternate source of data for the selected attribute;

automatically, determining, by the credit scoring computer, both a base credit score for the consumer independent of the financial data received from the first aggregator and the updated credit score, the updated credit scored determined by applying a credit scoring model to a set of attributes having values established using a combination of credit file data for the consumer and the financial data received from the first aggregator and using selected data employed in generating the base credit score including a data input update;

providing, from the credit scoring computer to the creditor computer via the network interface of the credit scoring computer, the updated credit score for the consumer and a quantified amount of any difference between the base credit score and the updated credit score determined by the credit scoring computer;

receiving, from a first credit reporting agency, the credit file data for the consumer, the first credit reporting agency selected from a plurality of credit reporting agencies; and processing the credit file data to automatically normalize the credit file data received from the first credit reporting agency in advance of generating the updated credit score, wherein each of the plurality of credit reporting agencies employ a different set of credit file data fields for the credit file data, respectively, the respective different set of credit file data fields being uniquely identified by each of the plurality of credit reporting agencies, and wherein the credit file data is organized using a first set of credit file data fields, an organization and an identification of the first set of credit file data fields being different than an organization and identification employed by others of the plurality of credit reporting agencies.

2. The method of claim 1, wherein the respective class-identifier provides a common definition for a first type of demand deposit account across each of the plurality of aggregators, the class-identifier applied based on a value of the first account code.

3. The method of claim 1, further comprising processing a plurality of attributes provided by the financial data to identify a consumer segment and associated credit score model with which to generate the updated credit score.

4. The method of claim 1 further comprising providing a data visualization by which the updated credit score and the quantified amount of any difference are presented in the graphical user interface.

5. A non-transitory computer-readable medium comprising computer program instructions executable by a processor that when executed by the processor performs a method of generating a credit score, the method comprising:

providing, from a credit scoring computer, to a creditor computer an API to allow the creditor computer to integrate functionality provided by the credit scoring computer, the functionality including a graphical user interface for entry of credentials by a consumer and communicated to the creditor computer via a network interface of the creditor computer, the credentials including information that securely and uniquely identifies the consumer allowing access to financial data including transactions recorded in at least one demand deposit account of the consumer;

receiving, at the credit scoring computer from the creditor computer via a network interface of the credit scoring computer, the credentials provided by the consumer to permit use of consumer permissioned data including the financial data to generate a credit score for the consumer;

providing from the credit scoring computer via the network interface of the credit scoring computer the credentials to a first aggregator selected from a plurality of aggregators, the first aggregator storing the consumer permissioned data using a first data structure that employs a first set of data fields to identify different types of demand deposit accounts, each of the plurality of aggregators employing different data structures that employ a different set of data fields for the consumer permissioned data including different sets of data fields to identify different types of demand deposit accounts, respectively, the respective different set of data fields being uniquely identified by each of the plurality of aggregators;

receiving, at the credit scoring computer from the first aggregator via the network interface of the credit scoring computer, the financial data for the at least one demand deposit account, the financial data organized using the first data structure and the first set of data fields, an organization and an identification of the first set of data fields being different than an organization and identification employed for the different data structures of others of the plurality of aggregators;

on receipt of the financial data from the first aggregator, processing the financial data, by the credit scoring computer, for each demand deposit account, to automatically assign a class identifier for the demand deposit account, respectively, the class identifier converting an account-type identification established by the first aggregator to identification information that is structured for processing by the credit scoring computer where it is employed by a credit scoring model in determining attribute values and an updated credit score for the consumer;

on receipt of the financial data, screening each demand deposit account, by the credit scoring computer, to automatically locate for each of a plurality of attributes a source of data that is most effective in determining a value of a selected attribute, the value being required by the credit scoring model for determining the updated credit score, the screening including:

screening for an existence of a first data field in the financial data, and where the first data field is available, employing a first value included in the first data field to determine the value of the selected attribute;

when the first data field is unavailable, screening for an existence of a second data field in the financial data, and where the second data field is available, employing a second value included in the second data field to determine the value of the selected attribute, the second data field being a first alternate source of data for the selected attribute; and when both the first data field and the second data field are unavailable, screening for an existence of a third data field in the financial data, and where the third data field is available, employing a third value included in the third data field to determine the value of the selected attribute, the third data field being a second alternate source of data for the selected attribute;

automatically, determining, by the credit scoring computer, both a base credit score for the consumer independent of the financial data received from the first aggregator and the updated credit score, the updated credit scored determined by applying a credit scoring model to a set of attributes having values established using a combination of credit file data for the consumer and the financial data received from the first aggregator and using selected data employed in generating the base credit score including a data input update;

providing, from the credit scoring computer to the creditor computer via the network interface of the credit scoring computer, the updated credit score for the consumer and a quantified amount of any difference between the base credit score and the updated credit score determined by the credit scoring computer;

receiving, from a first credit reporting agency, the credit file data for the consumer, the first credit reporting agency selected from a plurality of credit reporting agencies; and processing the credit file data to automatically normalize the credit file data received from the first credit reporting agency in advance of generating the updated credit score, wherein each of the plurality of credit reporting agencies employ a different set of credit file data fields for the credit file data, respectively, the respective different set of credit file data fields being uniquely identified by each of the plurality of credit reporting agencies, and wherein the credit file data is organized using a first set of credit file data fields, an organization and an identification of the first set of credit file data fields being different than an organization and identification employed by others of the plurality of credit reporting agencies.

6. The non-transitory computer readable medium of claim 5, the method wherein the respective class-identifier provides a common definition for a first type of demand deposit account across each of the plurality of aggregators, the class-identifier applied based on a value of the first account code.

7. The non-transitory computer readable medium of claim 5, the method further comprising processing a plurality of attributes provided by the financial data to identify a consumer segment and associated credit score model with which to generate the updated credit score.

8. The non-transitory computer readable medium of claim 5, the method further comprising providing a data visualization by which the updated credit score and the quantified amount of any difference are presented in the graphical user interface.

* * * * *